United States Patent
Schrof et al.

(10) Patent No.: US 6,447,836 B1
(45) Date of Patent: Sep. 10, 2002

(54) METHOD FOR OPTIMIZING LACQUERS

(75) Inventors: Wolfgang Schrof, Neuleiningen; Dieter Horn, Heidelberg; Reinhold Schwalm, Wachenheim; Uwe Meisenburg, Duisburg; Andreas Pfau, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/744,436
(22) PCT Filed: Jul. 23, 1999
(86) PCT No.: PCT/EP99/05293
§ 371 (c)(1),
(2), (4) Date: Jan. 24, 2001
(87) PCT Pub. No.: WO00/06306
PCT Pub. Date: Feb. 10, 2000

(30) Foreign Application Priority Data

Jul. 29, 1998 (DE) .......................................... 198 34 184

(51) Int. Cl.[7] .................................................. B05D 3/14
(52) U.S. Cl. ........................... 427/8; 118/300; 118/612; 118/665; 118/666; 118/688; 118/689; 118/708; 118/712; 118/713; 427/385.5; 427/402; 427/407.1; 427/489; 427/494; 427/496; 427/508; 427/532; 427/552; 427/553; 427/557; 427/558; 427/559; 427/595

(58) Field of Search ................................. 427/8, 9, 487, 427/494, 496, 508, 532, 553, 557, 558, 559, 595, 385.5, 407.1, 402; 119/665, 666, 688, 689, 708, 712, 713, 612, 300

(56) References Cited

U.S. PATENT DOCUMENTS 5,290,586 A    3/1994   Bushnell et al. ................ 427/8

FOREIGN PATENT DOCUMENTS

| DE | 35 42 767   | 6/1987 |
| EP | 0 616 843   | 9/1994 |
| EP | 0 706 834   | 4/1996 |
| WO | WO 81/00683 | 3/1981 |

*Primary Examiner*—Bernard Pianalto
(74) *Attorney, Agent, or Firm*—Keil & Weinkauf

(57) ABSTRACT

The present invention relates to a method of and a device for optimizing at least one coating material at at least one point of a substrate surface to which the coating material is applied. The method, which is carried out with the corresponding device, comprises at least the following steps: a) applying said at least one coating material to said at least one point of the substrate surface, b) curing said at least one coating material at said at least one point of the substrate surface, and c) determining the state, especially the curing and/or yellowing and/or gloss, of said coating material at said at least one point of the substrate surface, possessed by said coating material as a consequence of steps a) and b).

10 Claims, 1 Drawing Sheet

METHOD FOR OPTIMIZING LACQUERS

The present invention relates to a method of and to a device for optimizing coating materials, especially radiation-curable coating materials.

coating materials, especially radiation-curable coating materials, generally have a highly complex composition. Key components of a radiation-curable coating material include reactive diluents, oligomers, prepolymers, synergists, photoinitiators, light stabilizers, such as UV absorbers or sterically hindered amines, for example, pigments, dulling agents, flow agents and other additives. This results in a great diversity of possible coating compositions. To date, the coating materials have been formulated in practice by the trial and error principle and with many years of experience have been optimized in laborious series of tests, which have to be analyzed manually. Despite this costly and time-consuming procedure, the large number of possible coating compositions throws up only random hits of adequately satisfactory quality but does not lead to high-quality coatings determined systematically and in a targeted manner, since targeted investigation of the abovementioned sphere of parameters, conducted in parallel, is impossible owing to the massive effort it would entail. Predicting the properties of a certain composition for a coating material is possible only to a limited extent, since various components, such as photoinitiators and UV stabilizers, for example, have effects on one another which are nonlinear.

It is an object of the present invention to provide a method and a device for optimizing coating materials, said method and device allowing targeted and systematic variation in the key components of a coating material, especially of a radiation-curable coating material, in order to be able to arrive objectively at an optimum composition of the various components of the coating material.

We have found that this object is achieved by the method of the invention, as claimed in claim 1, and by the corresponding devices, as claimed in claims 5, 9 and 10 and the dependent subclaims. The method of the invention constitutes a method of optimizing at least one coating material at at least one point of a substrate surface to which the coating material is applied. In accordance with the invention, at least the following steps of the method are conducted in a device provided for that purpose:

a) applying said at least one coating material to said at least one point of said substrate surface.

Preferably, two or more different coating compositions are applied simultaneously at different points of the substrate surface, which together form a grid. The different compositions are suitably applied to the corresponding points of a desired substrate surface, such as a wood or metal or paper surface, for example, with the aid, for example, of metering pipettes, microdoctors or microspray heads, preferably under computer control.

The points of the substrate surface at which each of the different coating compositions is applied are preferably chosen to be very small, so as to enable application of many different coating compositions to a single substrate surface. The points of the substrate surface at which the coating compositions are applied preferably form a kind of matrix, corresponding to an arrangement of m rows each having n columns, n and m each being less than 1000. The size of an individual point of the substrate surface to which one of the different coating compositions is applied depends primarily on how the coating material is later to be characterized. Using current techniques it is possible to investigate up to 10,000 different coating compositions on 10 $cm^2$ of a substrate surface.

Thereafter, the coating compositions are optionally dried in order, for example, to allow evaporation of the solvent which is required in certain cases for optimum mixing.

b) Curing said at least one coating material at said at least one point of said substrate surface.

Preferably, the coating material, or the different coating compositions applied at different points of the substrate surface, which together form a grid, are radiation-cured. In the course of radiation curing, described for example in J.-P. Fouassier, *Photoinitiation, Photopolymerization and Photocuring*, Hanser Publishers, Munich, 1995, the mixture of the individual components of a coating composition is converted by exposure, preferably UV exposure, into a three-dimensional, mechanically stable polymer network. Advantages of this technology lie in the high speed, low energy consumption, virtually complete absence of environmentally harmful reaction products on curing, and low costs. Curing is preferably performed simultaneously for all corresponding points of the substrate surface, preferably by means of exposure over a large area with UV light or with electron beams. This results in three-dimensionally cured coating films at the corresponding points of the substrate surface. Exposure over a large area is very economic in time and energy terms and, furthermore, provides the required uniform processing of all coating films applied to the substrate surface. Preferably, the coating material, or the different coating compositions applied at different points of the substrate surface, which together form a grid, is or are heated in the course of curing. In this way it is possible first to accelerate the reaction—i.e., the formation of the three-dimensional network—and, second, to ensure that the reaction proceeds completely by itself.

c) Determining the condition, especially the curing and/or yellowing and/or gloss, of said at least one coating material at said at least one point of said substrate surface, possessed by said coating material as a consequence of steps a) and b).

As set out above, it is possible according to the invention to determine and/or analyze individually each of the parameters describing the condition, such as curing, yellowing and gloss, for example, or else all of the parameters are determined and/or analyzed, preference being given to the determination/analysis of all parameters since it gives virtually a complete picture of the condition of the coating material.

The cured coating material, or the different cured coating compositions applied to the substrate surface, is or are preferably characterized by means of a spectroscopic technique which has a high lateral local resolution and, if required, a sufficient depth resolution. In this way it can be ensured that in each case only one coating composition is characterized at one of the relevant points of the substrate surface, without any interaction with coating compositions that have been applied at adjacent points on the substrate surface. It is preferable here to use the method of confocal Raman spectroscopy. In this method, the coating network which forms in the course of curing is detected on the basis of the disappearance of reactive groups; in other words, the reaction conversion which takes place in the course of curing is determined directly (W. Schrof, L. H äuBling, Tiefenauflösung der Trocknungsvorgänge in Lackfilmen, in *"Farbe und Lack"*, 103, 1997, 22–27). In this case, by using highly sensitive spectrometers which operate primarily in backscattered light, the measurement times can be shortened to the order of seconds. For the state of the art in the field of Raman spectroscopy and, respectively, confocal imaging, reference may be made to Schrader B., *Infrared and Raman Spectroscopy*, VCH, Weinheim, 1995 and Markwort L., Kip B., Da Silva E., Roussel B., *Appl. Spectrosc.* 49 (1995) 1411–30. In addition to confocal Raman spectroscopy it is also possible to use IR spectroscopy or fluorescence spectroscopy. Fluorescence methods (O. Wolfbeiβ, *Fluorescence Spectroscopy: New Methods and Applications*, Springer, Berlin, 1993) analyze the structure of the coating network formed as a result of curing, analysis being carried out on the basis of the decrease in local mobility or translation diffusion of fluorescence probes. All of these optical methods can be carried out with high local resolution, in combination, for example, with suitable lenses or with a microscope. In a further preferred embodiment the optical imaging operations are carried out not with lenses or microscopes but with optical fibers (E.-G. Neumann, *"Single Mode Fibres"*, Springer, Berlin, 1988). As already mentioned, depth profiles of the network of the coating material to be characterized, said network coming about as a result of curing, can be determined by means of confocal Raman spectroscopy. Consequently, additional information is obtained relating to typical phenomena in radiation curing, such as, for example, oxygen inhibition at the substrate surface, or inadequate curing in deeper regions owing to depth-of-penetration effects for the UV light. An additional selection of suitable coating compositions is therefore made possible. By means of the confocal setup, for example, with a confocal diaphragm in the detection beam path, a depth level with a thickness of down to 1 μm is selected. An additional automatic focusing unit, which is preferably used, enables imaging onto the coating surface. Depth profiles are obtained by subsequent measurements at planes deeper relative to the coating surface. This is achieved preferably by computer-controlled raising of the substrate on whose surface the coating material has been applied, or by lowering the focus by means, for example, of a piezo-controlled optic.

In a further embodiment in accordance with the invention, curing is also determined mechanically by means of micro-sized hardness measuring devices (H.-H. Behncke, W. Weiler, Computergesteuerte Mikrohärtemessung unter Prüfkraft, in "Materialprüfung", Vol. 7, 1988) such as, for example, a Fischerscope or a nanoindenter. Penetration measurements at individual points (Bernham, R. J. Colton, Measuring the Nanomechanical Properties and Surface Forces of Materials Using an Atomic Force Microscope, *J. Vac. Sci. Technol.* Vol. A7, 1989, 2906) also make it possible to determine mechanical properties of the coating material concerned. With the aid of suitably chosen displacement platforms for the corresponding experimental setup, it is possible to scan the entire substrate surface.

The present invention additionally provides a device for the gridlike application of at least one coating material to a substrate surface, comprising:

a) a metering means for metering at least one component and preferably all components of said at least one coating material.

In this case the metering of the at least one component and preferably all components of said at least one coating material preferably takes place automatically.

b) A mixing means for mixing the individual components of said at least one coating material.

There are a number of possible procedures for achieving thorough mixing of the individual components. The components of a coating composition can be dissolved in a common solvent or in different, mutually compatible solvents and so mixed with one another, and/or they can be heated, and/or they can be mixed mechanically, such as by stirring or the use of ultrasound, for example. The systematic variation of the components and of their concentration in predeterminable steps produces a large number of different, liquid coating compositions.

c) A pipetting or spraying means for successive application of said at least one coating material to points on the substrate surface which together form a grid and which are locally mutually delimitable.

Said at least one coating material, or the different coating compositions, is or are applied with the aid of pipetting or spraying means to points on the substrate surface which are provided for this purpose. Preferably, use is made of pipetting or spraying robots, which permit an automated procedure which is therefore economic in terms of time and cost.

The locally delimitable points on the substrate surface, together forming a grid, which are intended for the application of in each case one coating composition, correspond, in a preferred embodiment of the invention, to recesses in the substrate surface which in their entirety form a grid on the substrate surface. The corresponding coating compositions are then filled into these recesses.

In a further preferred embodiment, the substrate surface is modified hydrophilically or, respectively, hydrophobically in a suitable manner, so that, here again, coating compositions can be applied to the substrate surface in a grid format without the unwanted mixing of different coating compositions.

To avoid sublimation of volatile components such as reactive diluents, the coated substrate is preferably covered with a UV-permeable film or coat.

In a further preferred embodiment of the invention, a grid of coating compositions is likewise applied to the substrate surface, but in this case the individual components are brought together directly on the substrate surface by means of suitable pipetting means, preferably pipetting robots, or by means of droplet generators, rather than being brought together first in a separate vessel. In order to be able to ensure thorough mixing of the individual components of a coating composition, they are always applied only in part, alternately or simultaneously, i.e., for example, by applying picoliter or nanoliter droplets. The reduction of the droplet size to a diameter in the micrometer range or to a volume in the picoliter range permits thorough mixing in the case of alternate or simultaneous application. This technique circumvents the step of mixing the individual components of a coating composition in external vessels. The possibility of employing this method, however, depends very heavily on the nature and interaction of the individual components of the corresponding coating composition that are to be mixed.

Furthermore, the present invention also provides a device for optimizing at least one coating material on a substrate surface, said device comprising, in addition to the device already described for the gridlike application of at least one coating material to a substrate surface, at least one curing means, preferably for simultaneous curing and, in particular, for simultaneous radiation-curing of said at least one coating material at the locally mutually delimitable points, which together form a grid, on the substrate surface, and at least one means of determining— preferably simultaneously— the condition of said at least one coating material at the locally mutually delimitable points, which together form a grid, on the substrate surface.

Determining the condition of said at least one coating material entails primarily determining the curing. In the case of the radiation curing of a coating composition, the curing is determined essentially by the conversion of the reactive components. As already mentioned, this conversion can be determined with the aid of spectroscopic methods. The vibration-based spectroscopic techniques, such as Raman and IR spectroscopy, determine the reaction conversion directly. The use of Raman spectroscopy is preferred. For this purpose, the device comprises a means of irradiating monochromatic light to at least one of the points on the substrate surface which together form a grid and are locally delimitable with respect to one another, and of detecting scattered light from said at least one of the points on the substrate surface which together form a grid and are locally delimitable with respect to one another, in order to be able thus to determine the reaction conversion, as a consequence of radiation curing, at said at least one of the points on the substrate surface which together form a grid and are locally delimitable with respect to one another.

Another alternative is offered by fluorescence spectroscopy, in which the structure of the physical network is determined by means of doped probes.

In order to be able to investigate relatively large lateral regions of the substrate surface, which is covered in gridlike manner with at least one but preferably two or more different coating compositions, it is also possible, within the framework of the present invention, to move the substrate (covered with the coating compositions to be analyzed) automatically by means of computer-controlled displacement platforms such that each of the points on the substrate surface which together form a grid and are locally delimitable with respect to one another, each of which points is covered with a coating composition, can be analyzed in succession. This technique permits parallelized measurements with a high sample throughput within a short time and without a high level of personnel deployment.

Determining the condition of the coating material also entails, inter alia, the characterization of the gloss and/or yellowing of the coating compositions to be investigated. As with the determination of the curing, gloss and yellowing can also be determined with local resolution from a spectroscopic analysis of reflected and/or scattered light.

Further advantages, features and possible applications of the invention are evident from the description which follows of an experimental setup according to the invention in conjunction with the corresponding figure, in which:

BRIEF DESCRIPTION OF THE DRAWING

In FIG. 1, the setup of a device of the invention is shown diagrammatically. Coating compositions to be investigated are each applied to the locally mutually delimitable points 2, which together form a grid, on a substrate surface 1. Using a spectroscopic technique, in this case the curing, gloss and yellowing of the individual coating compositions applied to the various points 2 of the substrate surface 1, and already cured, are determined. At these corresponding points, a spectrum is recorded in each case by means of an imaging and focusing lens 3 and a spectrometer 4: for example, a Raman microscope. From the spectra obtained in this way, it is then possible to make specific statements about the reaction conversion at the corresponding points of the substrate surface and thus, ultimately, about the curing, gloss and yellowing of the coating compositions applied at those points, that are the subject of investigation. Preferably, the reaction conversion is determined by means of an optical system which makes it possible to shift the focus of the monochromatic light introduced within the applied coating film, such as, for example, by means of confocal Raman spectroscopy. In this context it is possible to adjust an arbitrary depth segment within the coating film by moving the transmitter or the microscope lens back and forward along the optical axis by way of a piezoelectric translator. It is possible to achieve an accuracy of from about 1 to 3 $\mu$m in respect of the adjusted focus, i.e., of the desired depth segment. The depth definition can be adjusted by using a diaphragm or optical fiber of suitable internal diameter. In order to be able to investigate the entire substrate surface, i.e., in both the x and y directions, it is possible to move the substrate by means of a controllable translation platform.

Figure 1:
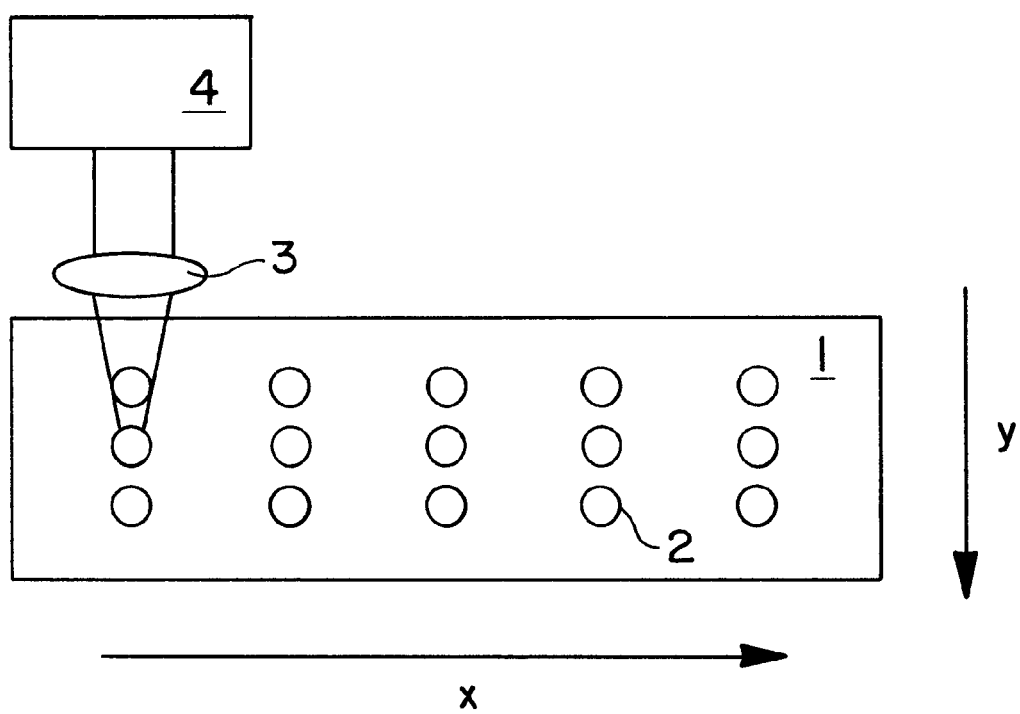
FIG. 1 shows a diagrammatic setup of a device, according to the invention, for optimizing at least one coating material on a substrate surface.

We claim:

1. A process for automatically producing and characterizing a plurality of coating compositions on a substrate surface, comprising
   a) applying different radiation-curable coating compositions at different points of a substrate surface, which together form a grid by means of metering pipettes, microdoctors or microspray heads under computer control,
   b) curing the coating compositions by radiation, and
   c) characterizing the different radiation cured coating compositions on the substrate surface are by means of spectroscopic methods, selected from the group consisting of confocal Raman spectroscopy, IR and fluorescence spectroscopy, and/or by means of microsized hardness measuring devices.

2. The process of claim 1, wherein the points, which together form a grid, on the substrate surface are recesses in the substrate surface into which the coating compositions are introduced.

3. The process of claim 2, wherein the substrate surface is modified hydrophilically or hydrophobically, so that coating compositions can be applied to the substrate surface in a grid format without the unwanted mixing of different coating compositions.

4. The process of claim 1, wherein the individual components of the coating compositions are brought together directly on the substrate surface by means of droplet generators.

5. The process of claim 1, wherein all coating compositions are simultaneously cured by means of exposure over a large area with UV-light or with electron beams.

6. The process of claim 1, wherein the cured coating compositions are characterized by means of confocal Raman spectroscopy.

7. The process of claim 1, wherein the cured coating compositions are characterized by means of a fisherscope or a nanoindenter.

8. The process of claim 1, wherein the substrate is moved automatically by means of a computer-controlled displacement platform such that each of the points on the substrate surface which together form a grid, each of which points is covered with a coating composition, are analyzed in succession.

9. The process of claim 1, wherein the coating compositions are characterized with respect to curing, gloss and yellowing.

10. The process of claim 1, wherein the different coating compositions are systematically varied, in order to arrive at an optimum composition.

* * * * *